US010216628B2

(12) United States Patent
Almasi et al.

(10) Patent No.: US 10,216,628 B2
(45) Date of Patent: *Feb. 26, 2019

(54) EFFICIENT AND SECURE DIRECT STORAGE DEVICE SHARING IN VIRTUALIZED ENVIRONMENTS

(71) Applicant: International Business Machines Corporation, Armonk, NY (US)

(72) Inventors: Gheorghe Almasi, Ardsley, NY (US); Hubertus Franke, Cortlandt Manor, NY (US); Gokul B. Kandiraju, Briarcliff Manor, NY (US); Davide Pasetto, Mount Kisco, NY (US); Hartmut Penner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,613

(22) Filed: Dec. 27, 2017

(65) Prior Publication Data

US 2018/0121352 A1    May 3, 2018

Related U.S. Application Data

(63) Continuation of application No. 14/584,058, filed on Dec. 29, 2014, now Pat. No. 9,892,037.

(51) Int. Cl.
*G06F 12/00* (2006.01)
*G06F 12/06* (2006.01)
(Continued)

(52) U.S. Cl.
CPC ............ *G06F 12/0646* (2013.01); *G06F 3/06* (2013.01); *G06F 9/50* (2013.01); *G06F 12/109* (2013.01);
(Continued)

(58) Field of Classification Search
CPC ...... G06F 12/0646; G06F 12/109; G06F 3/06; G06F 13/16; G06F 9/50; G06F 21/78;
(Continued)

(56) References Cited

U.S. PATENT DOCUMENTS

2006/0265561 A1    11/2006   Boyd et al.
2011/0239213 A1     9/2011   Aswani et al.
(Continued)

OTHER PUBLICATIONS

List of IBM Patents or Patent Applications Treated as Related.

*Primary Examiner* — Kalpit Parikh
(74) *Attorney, Agent, or Firm* — Scully, Scott, Murphy & Presser, P.C.; Jennifer Davis, Esq.

(57) ABSTRACT

A method, system and computer program product are disclosed for direct storage device sharing in a virtualized environment. In an embodiment, the method comprises assigning each of a plurality of virtual functions an associated memory area of a physical memory, and executing the virtual functions in a single root-input/output virtualization environment to provide each of a plurality of guests with direct access to the physical memory. In one embodiment, each of the guests is associated with a respective one of the virtual functions; and the assigning each of the plurality of virtual functions an associated memory area includes maintaining a per-virtual function mapping table identifying a respective one mapping function for each of the virtual functions, and each of the mapping functions mapping one of the memory areas of the physical area to an associated virtual memory.

12 Claims, 2 Drawing Sheets

(51) Int. Cl.
    *G06F 3/06*     (2006.01)
    *G06F 12/109*   (2016.01)
    *G06F 13/16*    (2006.01)
    *G06F 9/50*     (2006.01)
    *G06F 21/78*    (2013.01)

(52) U.S. Cl.
    CPC .............. *G06F 13/16* (2013.01); *G06F 21/78* (2013.01); *G06F 2212/1016* (2013.01); *G06F 2212/152* (2013.01); *G06F 2212/657* (2013.01)

(58) Field of Classification Search
    CPC ......... G06F 2212/152; G06F 2212/657; G06F 2212/1016
    See application file for complete search history.

(56) References Cited

U.S. PATENT DOCUMENTS

| | | |
|---|---|---|
| 2012/0102491 A1 | 4/2012 | Maharana |
| 2012/0284712 A1 | 11/2012 | Nimmagadda et al. |
| 2012/0297379 A1 | 11/2012 | Anderson et al. |
| 2015/0378641 A1 | 12/2015 | Franke et al. |

EFFICIENT AND SECURE DIRECT STORAGE DEVICE SHARING IN VIRTUALIZED ENVIRONMENTS

CROSS-REFERENCE TO RELATED APPLICATION

This application is a continuation of copending U.S. patent application Ser. No. 14/584,058, filed Dec. 29, 2014, the entire content and disclosure of which is hereby incorporated herein by reference.

BACKGROUND

This invention generally relates to sharing resources in virtualized environments, and more specifically, to storage device sharing in virtualized environments.

With the increased use of software defined environments such as cloud computing environments and/or software defined datacenters, there is a need for efficient virtualization along all physical resources. Most cloud computing environments heavily rely on virtualization of their resources. Best known are the technologies for central processing unit (CPU) virtualization, where many of the virtual machine concepts are now integrated into the processor architecture. Examples of these are dualities of page tables, interrupt routing, etc. This has significantly increased the performance of CPU virtualization and also contributed to the isolation properties among virtual machines that must be satisfied.

In contrast, storage I/O devices have seen limited attention for efficient sharing. In general, I/O devices are still managed indirectly by a hypervisor. Guest virtual machines interact through their device drivers to a virtual device that trapped into the hypervisor, where the storage function is then implemented against a storage device. In many cases, virtual disks (vdisks) are managed by the hypervisor as files. This leads to significant inefficiencies as disk input/outputs in the guest results in a trap into the hypervisor where a full I/O stack then needs to be traversed to translate the block access to the vdisk to a file access request, ultimately leading to a block request on the real storage device.

SUMMARY

Embodiments of the invention provide a method, system and computer program product for direct storage device sharing in a virtualized environment. In an embodiment, the method comprises assigning each of a plurality of virtual functions an associated memory area of a physical memory, and executing the virtual functions in a single root-input/output virtualization environment to provide each of a plurality of guests with direct access to the physical memory.

In one embodiment, each of the guests is associated with a respective one of the virtual functions; and the assigning each of the plurality of virtual functions an associated memory are includes maintaining a per-virtual function mapping table identifying a respective one mapping function for each of the virtual functions, and each of the mapping functions mapping one of the memory areas of the physical area to an associated virtual memory.

In an embodiment, each of the guests is associated with one of the virtual functions; and the assigning each of a plurality of virtual functions an associated memory area includes allocating storage memory area in the physical memory to each of the virtual functions, and providing a mapping function for each of the virtual functions to map the memory area in the physical memory assigned to said each virtual function to a virtual memory area for said each virtual function.

In one embodiment, the allocating storage memory area in the physical memory includes one of the guests sending a request to a storage controller using the virtual functions associated with said one of the guests; and the storage controller allocating said storage memory area in the physical memory to said associated virtual function, and providing the mapping function to said associated virtual function.

In an embodiment, the allocating storage memory area in the physical memory further includes said associated virtual function, in response to said request, triggering an interrupt of a physical function to a hypervisor; and the hypervisor determining whether to grant or to reject the request.

In one embodiment, the allocating storage memory area in the physical memory further includes when the hypervisor determines to grant the request, the hypervisor sending a configuration command over the physical function to the storage controller; and the storage controller using the configuration command to allocate the storage memory area in the physical memory to said associated virtual function, and to provide the mapping function to said associated virtual function.

In an embodiment, the one of the guests sending a request includes said one of the guests sending a request control block including the request to the storage controller, and the storage controller using the configuration command includes the storage controller sending an interrupt to said associated virtual function and providing the request control block with a positive result of the request.

In one embodiment, the request includes an authentication key identifying said one of the guests, and the storage controller allocating said storage memory area further includes the storage controller maintaining a table identifying one of the mapping functions for said authentication key.

In one embodiment, the executing the virtual functions includes the storage controller using said one of the mapping functions to map one of the memory areas in the physical memory to said one of the guests.

In an embodiment, the assigning each of a plurality of virtual functions an associated memory area includes assigning each of the virtual functions a respective one memory area of the physical memory, and the executing the virtual functions includes executing the virtual functions in the single-root input/output virtualization environment to provide each of the guests with direct access to a respective one of the memory areas of the physical memory.

Embodiments of the invention provide an enhanced disk controller optimized for operations in a virtualized environment. The disk controller exposes, for example, multiple PCIe virtual functions that can be directly attached to guest operating systems, removing the need of hypervisor involvement in disk access and thus providing wirespeed performance. Moreover, in embodiments of the invention, each guest has a device-generated authentication key, which is also stored on disk, that can be used for authentication and encryption.

DETAILED DESCRIPTION

Figure 1:
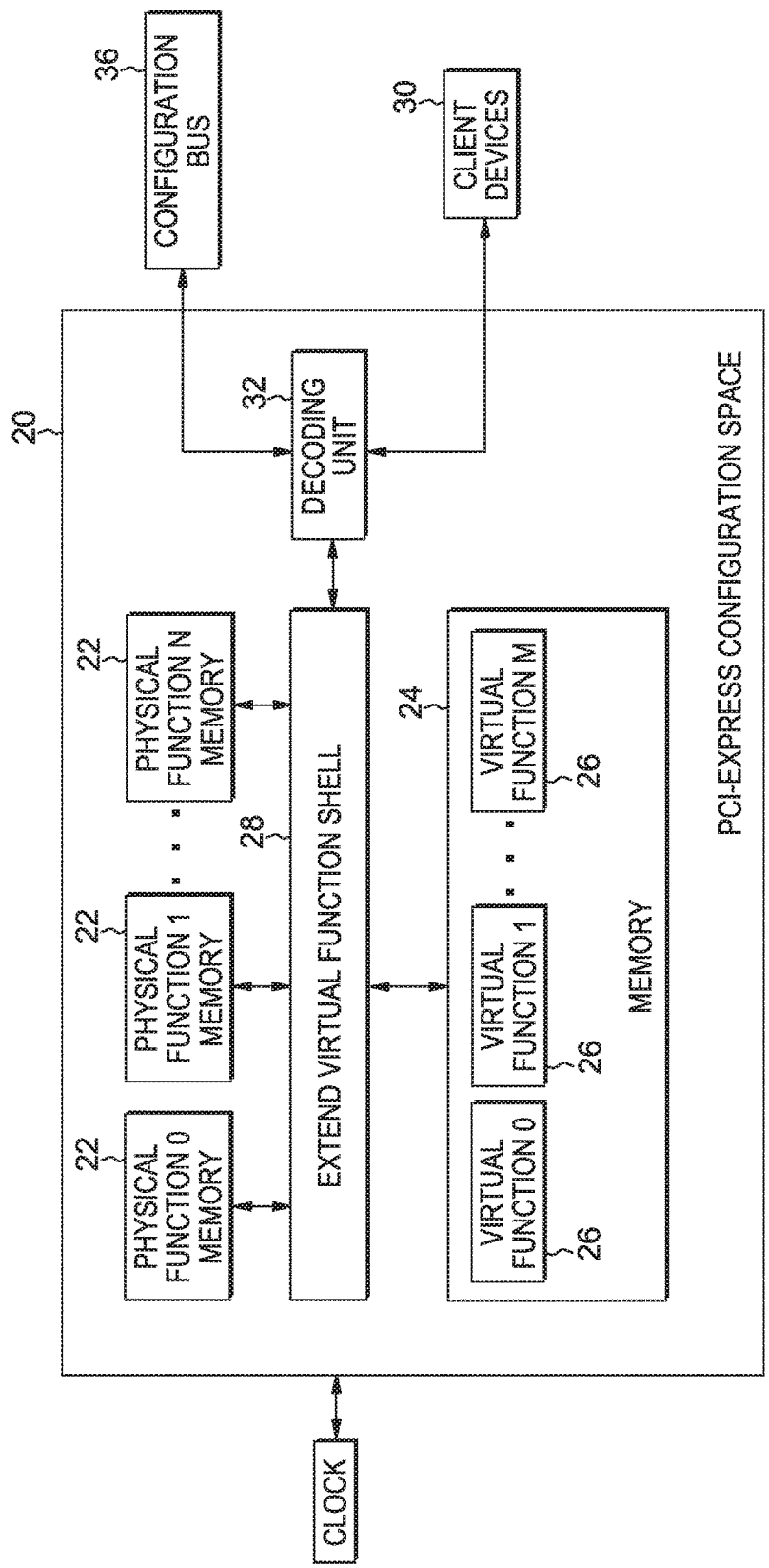
FIG. 1 is a block diagram of a PCI-Express configuration space configured to execute physical and virtual functions within a SR-IOV environment.

As discussed above, with the increased use of software defined environments such as cloud computing environments and/or software defined datacenters, there is a need for efficient virtualization along all physical resources. Most cloud computing environments heavily rely on virtualization of their resources. Best known are the technologies for central processing unit (CPU) virtualization, where many of the virtual machine concepts are now integrated into the processor architecture. Examples of these are dualities of page tables, interrupt routing, etc. This has significantly increased the performance of CPU virtualization and also contributed to the isolation properties among virtual machines that must be satisfied.

In contrast, storage I/O devices have seen limited attention for efficient sharing. In general, I/O devices are still managed indirectly by a hypervisor. Guest virtual machines interact through their device drivers to a virtual device that trapped into the hypervisor, where the storage function is then implemented against a storage device. In many cases, virtual disks (vdisks) are managed by the hypervisor as files. This leads to significant inefficiencies as disk input/outputs in the guest results in a trap into the hypervisor where a full I/O stack then needs to be traversed to translate the block access to the vdisk to a file access request, ultimately leading to a block request on the real storage device.

What is needed is a method and apparatus that allow a guest to access a vdisk that is located on the host without incurring additional overhead, yet maintaining the isolation requirements and quality of service (QoS) enforcements that a hypervisor executed I/O stack provides. The solution should also provide proper isolation among guest Operating Systems (OSes) and with the hypervisor itself.

Embodiments of the invention address this issue. Generally, this is done by providing an enhanced disk controller optimized for operations in a virtualized environment. The disk controller exposes, for example, multiple PCIe virtual functions that can be directly attached to guest operating systems, removing the need of hypervisor involvement in disk access and thus providing wirespeed performance.

PCIe (Peripheral Component Interconnect Express) is an architecture and related protocol used to interconnect processors and processor clusters with resources, such as process accelerators, memory storage devices, and input/output (I/O) devices. PCIe architecture employs a switch that provides fan-out for an input-output bus. The fan-out capability of the switch facilitates a series of connections for add-in, high performance input-output. PCIe has found applications in servers, storage devices, and other communications systems.

In a PCI Express system, a root complex device typically couples a processor and memory subsystem to a PCI Express switch fabric comprising one or more switch devices. The PCIe system also includes endpoints configured to perform and/or request PCI Express transactions. Each endpoint typically comprises one or more functions, and is mapped into the configuration space as a single function in a device that may include either the single function or multiple functions.

Implementing virtualization can increase the effective hardware resource utilization of a PCI-Express device (i.e., the number of applications executing on the device). This approach has been addressed in the Single Root I/O Virtualization (SR-IOV) and Sharing, as well as in the Multi Root I/O Virtualization (MR-IOV) and Sharing. Both the SR-IOV and MR-IOV specifications define extensions to the PCIe specification, and enable multiple system images to share PCIe hardware resources. A system image comprises computer software such as operating systems, used to execute applications or trusted services, e.g., a shared or non-shared I/O device driver.

SR-IOV and MR-IOV enable a PCIe device to appear to be multiple separate physical PCIe devices. In addition to functions, which comprise PCIe device configurations, SR-IOV and MR-IOV introduce the idea of physical functions and virtual functions, which can be used to enhance performance of the PCIe device.

Physical functions are full-featured PCIe functions that support the SR-IOV capability and are accessible either to a single root PCI manager (which can be part of a multi root system), a virtual image, or a system image. In addition to having the capability to convey data "in and out" of a PCIe device, physical functions typically have full configuration resources, thereby enabling them to configure or control the PCIe device via the physical functions.

Virtual functions are "lightweight" PCIe function that execute on a SR-IOV/MR-IOV endpoint, and are directly accessible by a system image. Each instance of a virtual function is associated with an underlying physical function and typically only has the ability to convey data in and out of the PCIe device.

FIG. 1 is a block diagram of a PCIe configuration space 20 that is an endpoint configured to execute virtual functions in a SR-IOV environment. PCI configuration space 20 comprises multiple physical functions 22 configured to store the shared data for each of the physical functions. In the configuration shown in FIG. 1, there are N+1 physical functions 22, one for each physical function supported by configuration space 20. In some embodiments, each physical function 22 may comprise dedicated data registers, a dedicated memory array, or a combination of the two. In alternative embodiments, two or more of physical functions 22 may share a single memory array. Typically, the configuration of physical functions 22 may depend on a memory requirement for each of the physical functions.

PCIe configuration space 20 also comprises a memory 24 configured to store unique data for virtual function instance 26 currently active on configuration space 20. In the configuration shown in FIG. 1, there are M+1 instances of virtual functions 26 active on configuration space 20.

Upon receiving a virtual function call, an extended virtual function shell 28 retrieves shared data from the underlying physical function associated with the virtual function, and retrieves the unique data from the virtual function instance in memory 24 allocated to the called virtual function. Virtual function shell 28 comprises hardware logic dedicated to executing virtual function calls per the SR-IOV/MR-IOV specification by performing a specific calculation. Using the retrieved shared and unique data, virtual function shell 28 calculates a result, and stores the result to memory 24. Alternatively, virtual function 28 may convey the result to one or more client devices 30 via a decoding unit 32. Examples of client devices include, but are not limited to a transport layer, a data link layer and a physical layer.

A configuration bus 36 is coupled to decoding unit 32, and configured to enable software applications executing on a processor (not shown) coupled to configuration space 20 to read and write values to virtual functions 26 in the configuration space.

Embodiments of the invention provide virtual disks to a guest by using the PCIe SR-IOV standard and a mechanism to map physical blocks of the physical disk to those guests.

Figure 2:
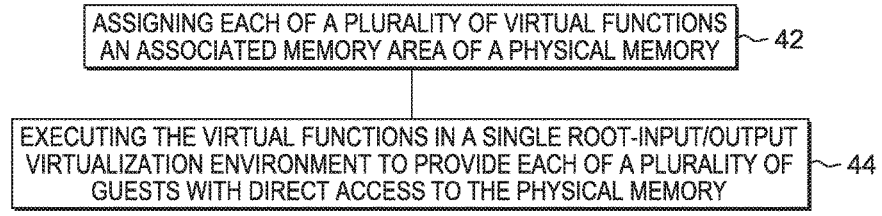
FIG. 2 illustrates a method for direct storage device sharing in accordance with an embodiment of the invention.

With reference to FIG. 2, in an embodiment, the invention provides a method of direct storage device sharing in a virtualized environment. This method comprises, at 42, assigning each of a plurality of virtual functions an associated memory area of a physical memory, and, at 44, executing the virtual functions in a single root-input/output virtualization environment to provide each of a plurality of guests with direct access to the physical memory.

Figure 3:
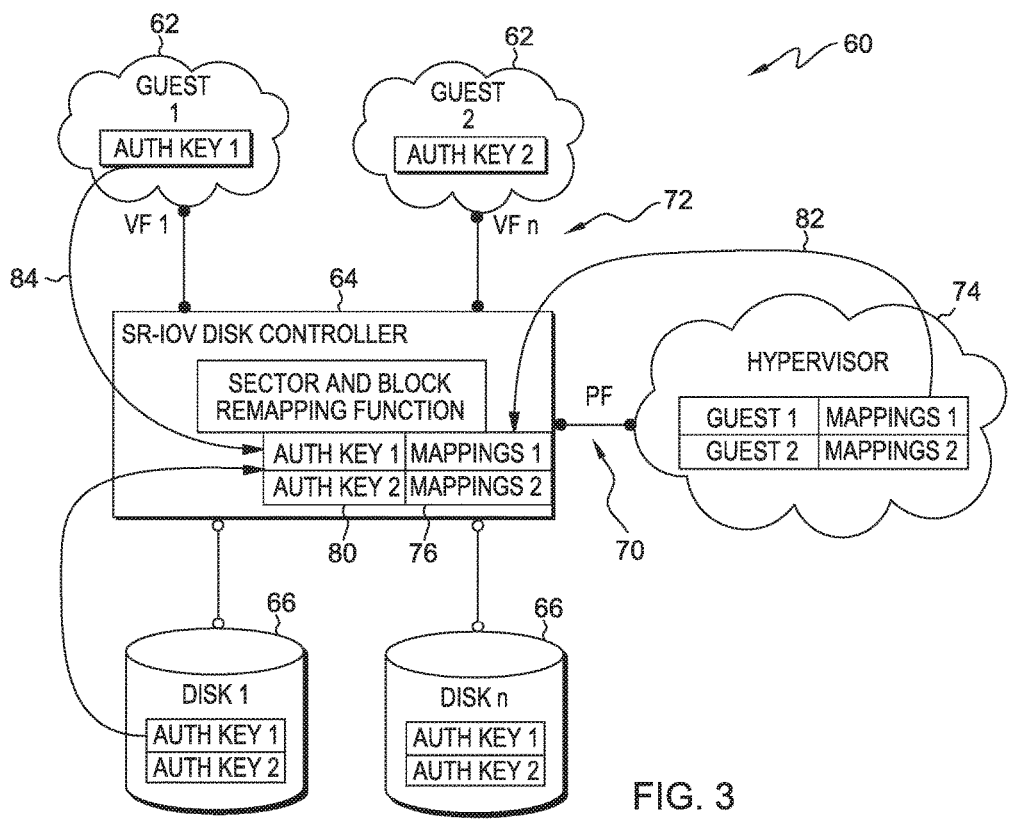
FIG. 3 shows a system architecture and main configuration parameters exchange in accordance with an embodiment of the invention.

FIG. 3 shows a system architecture 60 and main configuration parameters exchange of an embodiment of the invention. In this embodiment, the guest 62 is able to access a disc controller 64 and the disks 66 behind it as the guest would access a non-virtualized disk. For this, a specific PCIe storage device is defined which has, besides the physical function (PF) 70, the ability to dynamically create 1-n virtual functions (VF) 72 as defined by the PCIe SR-IOV specification. When a guest is created by a hypervisor 74, a VF is also created and assigned by direct mapping 76 of the storage device into the guest address space, giving the guest full access of that VF.

At first boot, the guest 62 will send a specific request block over the VF's mmio space to the storage device 64. This request control block contains the guest parameters for the disk like size and QoS (IOIPS), and also an authentication key 80 for the requested virtual disk (vdisk). The VF will trigger, as an action to this request block, an interrupt of the PF 70 to the hypervisor 74. Over PCIe methods on the PF, the hypervisor will then retrieve the data of the request block and grant or reject the request based on the allowance of the guest.

On grant, the hypervisor 74 will, at 82, send a configuration command block over the PF to the storage device 64, and this configuration command block contains the guest parameters like size and QoS. This will (a) set up the hardware in the storage device 64 to allocate the storage and provide a mapping function for the requesting VF. This will also (b) send an interrupt to the requesting VF and provision, over PCIe methods, the response command block with the positive result of the request.

For subsequent boot, the guest 62 will, at 84, send to the VF the authentication key in a command block requesting access only. The storage device hardware and firmware will set up the mapping accordingly such that the device can only access those blocks based on the initial set up for that authentication key. No hypervisor invocation is done.

Once the authentication set up is done, the vdisk can be accessed directly from the guest 62 without intervention of the hypervisor 74. The storage controller 64 implements the per vdisk mapping of logical vdisk blocks to physical disk blocks while enforcing QoS. Those blocks mapped to the guest are only visible and accessible to those guests containing the authentication key. Since the access to the vdisk is done over the authentication key 80, multiple guests or the hypervisor can access the vdisk in order to do backup and other maintenance related functions.

The usage of SR-IOV as means of virtualizing the storage device 66 enables the storage device 66 to be used for many types of storage protocols, ranging from those for local attached SATA or SAS drives to FC attached external SANs.

Incoming commands on a VF are remapped by the controller, changing logical sector and block coordinates into physical sector and block coordinates, and the commands are then executed over the connected disks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present invention has been presented for purposes of illustration and description, but is not intended to be exhaustive or to limit the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A computer system for direct storage device sharing in a virtualized environment, comprising:
   a memory unit for storing data; and
   one or more processor units connected to the memory unit for transmitting data to and receiving data from the memory unit, the one or more processor units configured to operate as:
   a storage controller for assigning each of a plurality of virtual functions an associated memory area of a physical memory, and executing the virtual functions in a single root-input/output virtualization environment to provide each of a plurality of guests with direct access to the physical memory, including:
      at a first boot of one of the guests, the storage controller receiving a request from the one of the guests, and in response to the request, triggering an interrupt of a physical function to a hypervisor; and the storage controller receiving from the hypervisor a configuration command over the physical function, the configuration command setting up hardware in the storage controller to allocate storage in the storage device for said one of the guests and providing a mapping function for the one of the guests; and
      for a subsequent boot of the one of the guests, after said first boot, the storage controller receiving a subsequent request from the one of the guests, and the storage controller setting up mapping for the one of the guests, without intervention of the hypervisor during said subsequent boot, using the mapping function provided to the storage controller at the first boot of the one of the guests prior to said subsequent boot, to provide said one of the guests with direct access to the physical memory.

2. The system according to claim 1, wherein:
   each of the guests is associated with a respective one of the virtual functions; and
   the storage controller maintains a per-virtual function mapping table identifying a respective one mapping function for each of the virtual functions, and uses each of the mapping functions to map one of the memory areas of the physical area to an associated virtual memory.

3. The system according to claim 1, wherein:
   each of the guests is associated with one of the virtual functions; and
   the storage controller allocates storage memory area in the physical memory to each of the virtual functions, and provides a mapping function for each of the virtual functions to map the memory area in the physical memory assigned to said each virtual function to a virtual memory area for said each virtual function.

4. The system according to claim 3, wherein:
   each of the guests sends a request to the storage controller using the virtual functions associated with said each guest; and
   for each of the guests, the storage controller allocates said storage memory area in the physical memory to the virtual function associated with said each guest, and provides the mapping function to said associated virtual function.

5. The system according to claim 4, wherein:
the request from each guest includes an authentication key identifying said each guest; and the storage controller maintains a table identifying one of the mapping functions for each authentication key.

6. The system according to claim 1, wherein:
the hypervisor determines whether to grant or to reject the request; and when the hypervisor determines to grant the request, the hypervisor sends the configuration command to the storage controller.

7. The system according to claim 1, wherein:
when the storage in the storage device is allocated and the mapping function is provided for said one of the guests, said one of the guests can access said allocated storage without intervention of the hypervisor.

8. An article of manufacture comprising:
at least one tangible non-transitory computer readable storage device having computer readable program code logic embodied therein for direct storage device sharing in a virtualized environment, the computer readable program code logic, when executing, performing the following:
assigning each of a plurality of virtual functions an associated memory area of a physical memory, including:
   at a first boot of one of a plurality of guests, receiving at a storage controller a request from the one of the guests, and in response to the request, triggering an interrupt of a physical function to a hypervisor; and receiving at the storage controller and from the hypervisor a configuration command over the physical function, the configuration command setting up hardware in the storage controller to allocate storage in the storage device for said one of the guests and providing a mapping function for the one of the guests;
   for a subsequent boot of the one of the guests, after said first boot, the storage controller receiving a subsequent request from the one of the guests, and the storage controller setting up mapping for the one of the guests, without intervention of the hypervisor during said subsequent boot, using the mapping function provided to the storage controller at the first boot of the one of the guests prior to said subsequent boot, to provide said one of the guests with direct access to the physical memory; and
executing the virtual functions in a single root-input/output virtualization environment to provide each of the plurality of guests with direct access to the physical memory.

9. The article of manufacture according to claim 8, wherein:
each of the guests is associated with a respective one of the virtual functions; and
the assigning each of the plurality of virtual functions an associated memory area includes:
   maintaining a per-virtual function mapping table identifying a respective one mapping function for each of the virtual functions; and
   each of the mapping functions mapping one of the memory areas of the physical area to an associated virtual memory.

10. The article of manufacture according to claim 8, wherein:
each of the guests is associated with one of the virtual functions; and
the assigning each of a plurality of virtual functions an associated memory area includes allocating storage memory area in the physical memory to each of the virtual functions, and providing a mapping function for each of the virtual functions to map the memory area in the physical memory assigned to said each virtual function to a virtual memory area for said each virtual function; and
the allocating storage memory area in the physical memory includes, one of the guests sending a request to a storage controller using the virtual functions associated with said one of the guests, and the storage controller allocating said storage memory area in the physical memory to said associated virtual function, and providing the mapping function to said associated virtual function.

11. The article of manufacture according to claim 10, wherein:
the allocating storage memory area in the physical memory further includes
said associated virtual function, in response to said request, triggering an interrupt of an physical function to a hypervisor;
the hypervisor determining whether to grant or to reject the request; and
when the hypervisor determines to grant the request, the hypervisor sending a configuration command over the physical function to the storage controller; and the storage controller using the configuration command to allocate the storage memory area in the physical memory to said associated virtual function, and to provide the mapping function to said associated virtual function.

12. The article of manufacture according to claim 11, wherein:
the request includes an authentication key identifying said one of the guests; and
the storage controller allocating said storage memory area further includes the storage controller maintaining a table identifying one of the mapping functions for said authentication key.

* * * * *